United States Patent
Yoshida et al.

(10) Patent No.: US 11,906,064 B2
(45) Date of Patent: Feb. 20, 2024

(54) ELECTRIC VALVE

(71) Applicant: FUJIKOKI CORPORATION, Tokyo (JP)

(72) Inventors: Tatsuya Yoshida, Tokyo (JP); Yusuke Arai, Tokyo (JP); Satoshi Uehara, Tokyo (JP); Takeshi Hosoya, Tokyo (JP)

(73) Assignee: FUJIKOKI CORPORATION, Tokyo (JP)

( * ) Notice: Subject to any disclaimer, the term of this patent is extended or adjusted under 35 U.S.C. 154(b) by 294 days.

(21) Appl. No.: 17/441,825

(22) PCT Filed: Mar. 4, 2020

(86) PCT No.: PCT/JP2020/009236
§ 371 (c)(1),
(2) Date: Sep. 22, 2021

(87) PCT Pub. No.: WO2020/203007
PCT Pub. Date: Oct. 8, 2020

(65) Prior Publication Data
US 2022/0196172 A1 Jun. 23, 2022

(30) Foreign Application Priority Data
Mar. 29, 2019 (JP) ................. 2019-066877

(51) Int. Cl.
*F16K 27/02* (2006.01)
*F16K 31/04* (2006.01)
(Continued)

(52) U.S. Cl.
CPC ........ *F16K 27/029* (2013.01); *B29C 65/1635* (2013.01); *B29C 65/1654* (2013.01);
(Continued)

(58) Field of Classification Search
CPC .. F16K 27/029; F16K 31/047; F16K 37/0041; F16K 27/102; F16K 27/12;
(Continued)

(56) References Cited

U.S. PATENT DOCUMENTS 7,862,874 B2 1/2011 Asada et al.
2013/0048890 A1 2/2013 Miura
(Continued)

FOREIGN PATENT DOCUMENTS

CN 203037579 U 7/2013
CN 108692086 A 10/2018
(Continued)

OTHER PUBLICATIONS

PCT, Written Opinion of ISA for the corresponding application No. PCT/JP2020/009236, dated May 26, 2020, with English translation.
(Continued)

*Primary Examiner* — William M McCalister
(74) *Attorney, Agent, or Firm* — LUCAS & MERCANTI, LLP

(57) ABSTRACT

An electric valve can be further miniaturized while reducing the number of manufacturing man-hours. The electric valve contains: a motor including a stator member and a rotor member that displace a valve body, and a housing for accommodating the motor. The housing is formed by joining a heat generation portion formed of a first material to a heat receiving portion formed of a second material. The light transmittance in the first material is lower than the light transmittance in the second material.

7 Claims, 5 Drawing Sheets

(51) Int. Cl.
  *B29C 65/16*   (2006.01)
  *B29C 65/00*   (2006.01)
  *F16K 37/00*   (2006.01)
  *F16K 27/10*   (2006.01)
  *F16K 27/12*   (2006.01)
  *F16K 31/50*   (2006.01)
  *B29L 31/34*   (2006.01)
  *B29L 31/00*   (2006.01)
  *B29C 65/08*   (2006.01)

(52) U.S. Cl.
  CPC ...... *B29C 66/1222* (2013.01); *B29C 66/1224* (2013.01); *B29C 66/131* (2013.01); *B29C 66/542* (2013.01); *B29C 66/71* (2013.01); *B29C 66/73921* (2013.01); *B29C 66/81267* (2013.01); *F16K 27/102* (2013.01); *F16K 27/12* (2013.01); *F16K 31/047* (2013.01); *F16K 31/50* (2013.01); *F16K 31/508* (2013.01); *F16K 37/0033* (2013.01); *B29C 65/08* (2013.01); *B29L 2031/3481* (2013.01); *B29L 2031/7506* (2013.01); *F16K 31/04* (2013.01); *F16K 37/0041* (2013.01)

(58) Field of Classification Search
  CPC ........ F16K 31/508; F16K 31/04; F16K 31/53; F16K 31/50; F16K 37/0033; B29L 2031/3481; B29L 2031/7506; B29C 65/08; B29C 65/1635; B29C 66/73921; B29C 66/8122; B29C 66/1222; B29C 66/1224; B29C 66/131; B29C 66/542; B29C 66/71; B29C 66/81267
  USPC .................................... 251/129.11
  See application file for complete search history.

(56) References Cited

U.S. PATENT DOCUMENTS

| | | | |
|---|---|---|---|
| 2017/0018748 A1* | 1/2017 | Matsuura | H01M 50/317 |
| 2017/0256821 A1* | 9/2017 | Suzuki | H01G 11/74 |
| 2018/0038514 A1* | 2/2018 | Kuszneruk | F16K 99/0044 |
| 2018/0283572 A1 | 10/2018 | Bartow et al. | |
| 2019/0353271 A1 | 11/2019 | Jehara et al. | |
| 2020/0240539 A1 | 7/2020 | Lan et al. | |

FOREIGN PATENT DOCUMENTS

| | | |
|---|---|---|
| CN | 109424777 A | 3/2019 |
| EP | 1903266 A2 | 3/2008 |
| EP | 3382247 A1 | 10/2018 |
| JP | S60-231081 A | 11/1985 |
| JP | 2000-269028 A | 9/2000 |
| JP | 3129668 B2 | 1/2001 |
| JP | 2002-295272 A | 10/2002 |
| JP | 4377419 B2 | 12/2009 |
| JP | 2011-218239 A | 11/2011 |
| JP | 2014-069371 A | 4/2014 |
| JP | 2018-135908 A | 8/2018 |
| WO | 2008/001583 A1 | 1/2008 |

OTHER PUBLICATIONS

PCT, International Search Report for the corresponding application No. PCT/JP2020/009236, dated May 26, 2020, with English translation.
Extended European Search Report (EESR) dated Nov. 28, 2022 for corresponding European Application No. 20783005.0.
Office Action dated Dec. 1, 2022 for corresponding Korean Application No. 10-2021-7029975, with an English translation.
Office Action dated Mar. 30, 2023, for corresponding Chinese Application No. 202080025661.3, with English translation.
Office Action dated Apr. 24, 2023, for corresponding Korean Application No. 10-2021-7029975, with English translation.
Office Action dated Nov. 1, 2023, for corresponding Chinese Application No. 202080025661.3, with English translation.

* cited by examiner

ELECTRIC VALVE

CROSS REFERENCE TO RELATED APPLICATION

This Application is a 371 of PCT/JP2020/009236 filed on Mar. 4, 2020 which, in turn, claimed the priority of Japanese Patent Application No. 2019-066877 filed on Mar. 29, 2019, both applications are incorporated herein by reference.

TECHNICAL FIELD

The present invention relates to an electric valve.

BACKGROUND OF THE INVENTION

Conventionally, as a so-called electric valve for opening and closing a valve electrically, those provided with a power transmission device for decelerating the rotational force of a stepping motor with a speed reduction device or directly transmitting the rotational force to a screw mechanism are known (see Patent Document 1.)

Such a stepping motor for an electric valve is housed in a sealed state in a housing to prevent moisture, foreign matter, and the like from adhering to a circuit board or the like.

CITATION LIST

Patent Documents

[Patent Document 1] Japanese Unexamined Patent Application Publication No. 2018-135908

SUMMARY OF INVENTION

Technical Problem

Here, in the electric valve disclosed in Patent Document 1, a housing member is formed by a tube-shaped member and a cover member covering the tube-shaped member, and in order to further ensure the sealing properties in the housing member, a packing is disposed between the tube-shaped member and the cover member. For this reason, in addition to the increase in manufacturing man-hours due to the increase in the number of assembled parts, there is a problem that the housing member becomes large due to the provision of a peripheral groove for arranging the packing or a snap-fit structure for fixing the tube-shaped member and the cover member to each other.

Accordingly, an object of the present invention is to provide an electric valve that can be further miniaturized while reducing manufacturing man-hours.

Means for Solving the Problems

In order to achieve the above object, an electric valve according to the present invention includes a motor including a rotor member and a stator member for applying a rotational force to the rotor member; a power transmission mechanism for converting rotational movement of the rotor member into axial movement of a valve body; a housing for accommodating the motor and the power transmission mechanism; and a base member connected to the housing and provided with a valve seat to which the valve body is separated or seated, wherein: the housing includes: a heat generation portion formed of a first material, and a heat receiving portion formed of a second material and bonded to the heat generation portion, and a laser light transmittance in the first material is lower than a laser light transmittance in the second material.

Advantageous Effects of Invention

According to the present invention, it is possible to provide an electric valve that can be further miniaturized while reducing manufacturing man-hours.

DESCRIPTION OF EMBODIMENT(S)

Hereinafter, an electric valve according to the embodiments of the present invention will be described with reference to the drawings. It should be noted that, in the present specification, the direction from the rotor to the valve seat is defined as the downward direction, and the opposite direction thereof is defined as the upward direction.

First Embodiment

Figure 1:
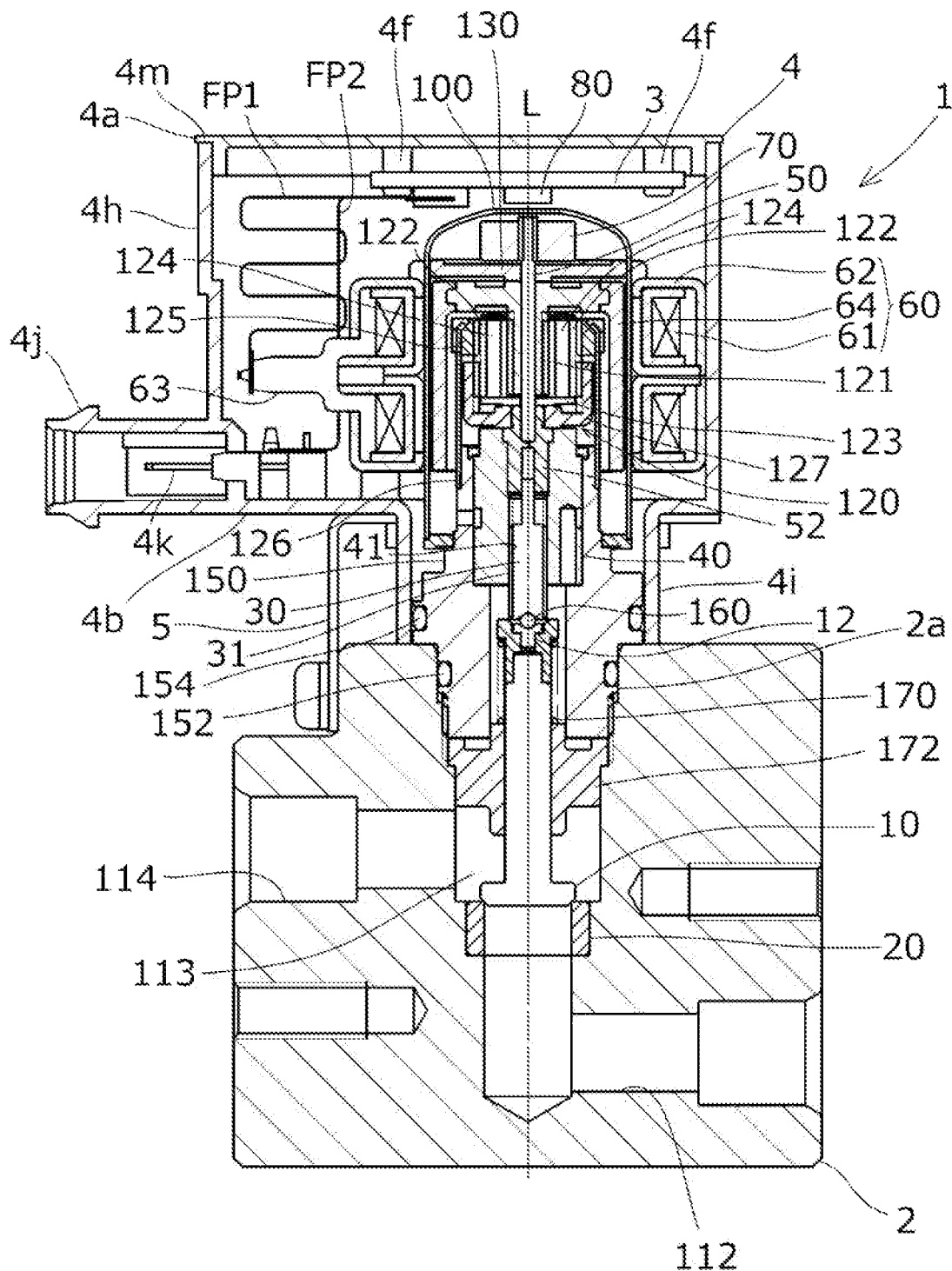
FIG. 1 is a schematic sectional view illustrating an overview of an electric valve according to the first embodiment.

Referring to FIG. 1, a description will be provided of the electric valve 1 according to the first embodiment. FIG. 1 is a schematic sectional view illustrating an overview of an electric valve 1 according to the first embodiment.

The electric valve 1 includes, accommodated in the housing 4, a driver 30, a rotary shaft 50, a stepping motor 60 for transmitting a rotational force to the rotary shaft 50, a power transmission mechanism 120 for converting and transmitting the rotary motion of the rotary shaft 50 into axial motion of the valve body 10, a permanent magnet 70 mounted so as to rotate together with the rotary shaft 50, and an angle sensor 80 for detecting the rotation angle of the permanent magnet 70, and a valve body 10 and a valve seat 20 accommodated in the lower base member 2.

The lower base member 2 includes a first flow path 112 and a second flow path 114. When the valve body 10 is separated from valve seat 20, in other words, when the valve body 10 is in an upper position, the fluid flows into the valve chamber 113 through the first flow path 112 and is discharged through the second flow path 114. In contrast, when the valve body 10 is seated on the valve seat 20, in other words, when the valve body 10 is in a lower position, the first flow path 112 and the second flow path 114 are not in communication with each other.

The stepping motor 60 includes a stator member 62 including a coil 61, and a rotor member 64. A pulse signal is input to the coil 61 from a control substrate 3 that is provided with a drive circuit for driving the stepping motor 60 via a power supply portion 63. Then, when a pulse signal is input to the coil 61, the rotor member 64 rotates by a rotation angle corresponding to the number of pulses of the pulse signal.

(Power Transmission Mechanism)

The power transmission mechanism 120 is a member that connects the rotor member 64 and the rotary shaft 50 so as to be able to transmit power. The power transmission mechanism 120 includes a plurality of gears. The power transmission mechanism 120 may include a planetary gear mechanism.

The stator member 62 is fixed to the side wall of the can 100. The rotor member 64 is rotatably disposed with respect to the can 100 inside the side wall of the can 100. The rotor member 64 is formed of a magnetic material and is connected to a solar gear body 121 having a coaxial shaft hole.

The rotary shaft 50 is disposed in the shaft hole of the solar gear body 121 so as to be relatively rotatable. The external teeth of the solar gear body 121 mesh with a plurality of planetary gears 122. Each planetary gear 122 is rotatably supported by a shaft 124 supported by a carrier 123. The outer teeth of each planetary gear 122 mesh with an annular ring gear 125.

The ring gear 125 is a member that is not rotatable relative to the can 100. The ring gear 125 is supported by a holder 150 via a cylindrical support member 126.

The planetary gear 122 also meshes with an annular second ring gear 127. The second ring gear 127 functions as an output gear which is fixed to the rotary shaft 50.

The gear configuration described above constitutes what is known as a mechanical paradox planetary gear mechanism. In a reduction device using a mechanical paradox planetary gear mechanism, by setting the number of teeth of the second ring gear 127 to be slightly different from the number of teeth of the ring gear 125, the rotation speed of the solar gear body 121 can be reduced by a large reduction ratio and transmitted to the second ring gear 127.

It should be noted that, although a mechanical paradox planetary gear mechanism is used as the power transmission mechanism 120, any power transmission mechanism can be utilized as the power transmission mechanism between the rotor member 64 and the rotary shaft 50. A planetary gear mechanism other than a mechanical paradox planetary gear mechanism may be utilized as the power transmission mechanism 120.

A connecting member 52 is attached to the lower end of the rotary shaft 50, and the connecting member 52 and the upper end of the driver 30 rotate integrally in the rotation direction, but are connected so as to be relatively movable in the axial direction.

A male screw 31 is provided on the outer peripheral surface of the driver 30. The male screw 31 is screwed into a female screw 41 provided on a guide member 40 that guides the driver. For this reason, when the rotary shaft 50 and the driver 30 rotate around the axis, the driver 30 moves up and down while being guided by the guide member 40. In contrast, the rotary shaft 50 is rotatably supported by the solar gear body 121 or the guide member 40, and cannot move in the axial direction.

The guide member 40 for guiding the driver 30 is supported by the holder 150.

The lower end of the driver 30 is rotatably connected to the upper end of the valve body 10 via a ball 160. As the drivers 30 move upward or downward while rotating about the axis, the valve body 10 moves upward or downward without rotating about the axis.

The valve body 10 is urged upward by a spring member 170 disposed between the spring receiving member 172 attached to the opening 2a of the lower base member 2 and the valve body 10.

When the driver 30 moves downward, the valve body 10 is pushed downward against the urging force of the spring member 170 and displaced. In contrast, when the driver 30 moves upward, the valve body 10 is pushed upward by the urging force of the coil 170 and displaced.

A partition member 130 is disposed inside the can 100. In addition, a permanent magnet 70 is disposed in an upper space of the can 100 formed by the partition member 130. The permanent magnet 70 is connected at the vicinity of the upper end of the rotary shaft 50 that penetrates the partition member 130.

With the above configuration, it is possible to drive the valve body 10 by using the power from the stepping motor 60. The amount of movement of the valve body 10 in the direction along the axis L is proportional to the amount of rotation of the rotary shaft 50 and the permanent magnet 70. Accordingly, by measuring the rotation angle around the axis of the permanent magnet 70 with the angle sensor 80 attached to the lower surface of the control substrate 3, it is possible to accurately determine the position of the valve body 10 in the direction along the axis L.

Since the rotary shaft 50 and the permanent magnet 70 do not move up and down with respect to the angle sensor 80, it is possible to accurately calculate the rotation angle of the permanent magnet 70 using the angle sensor 80.

The lower portion of the hollow cylindrical holder 150 is disposed in the opening 2a of the lower base member 2. A packing 152 is disposed between the holder 150 and the lower base member 2.

Further, the holder 150 is disposed so as to be in contact with the inner wall portion of the housing 4. In addition, a packing 154 is disposed between the holder 150 and the inner wall portion of the housing 4.

For this reason, the holder 150 has a function of preventing the fluid from entering the space in which the stator member 62 and the like are disposed, and a function of accommodating the upper end portion 12 of valve body 10.

(Housing)

Next, the housing 4 will be described. The housing 4 includes a cover member 4a and a tube-shaped member 4b. The tube-shaped member 4b of the housing 4 is supported by a plate-shaped stay 5 bent in an L shape, one end of which is screwed to the lower base member 2.

Figure 2:
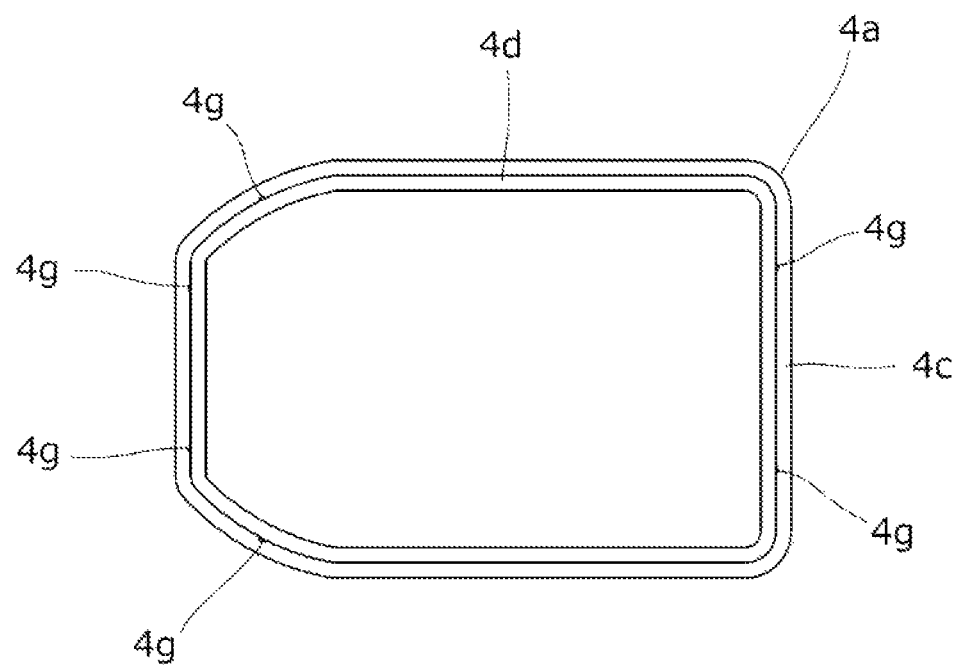
FIG. 2 is a bottom view of a cover member.
Figure 3:
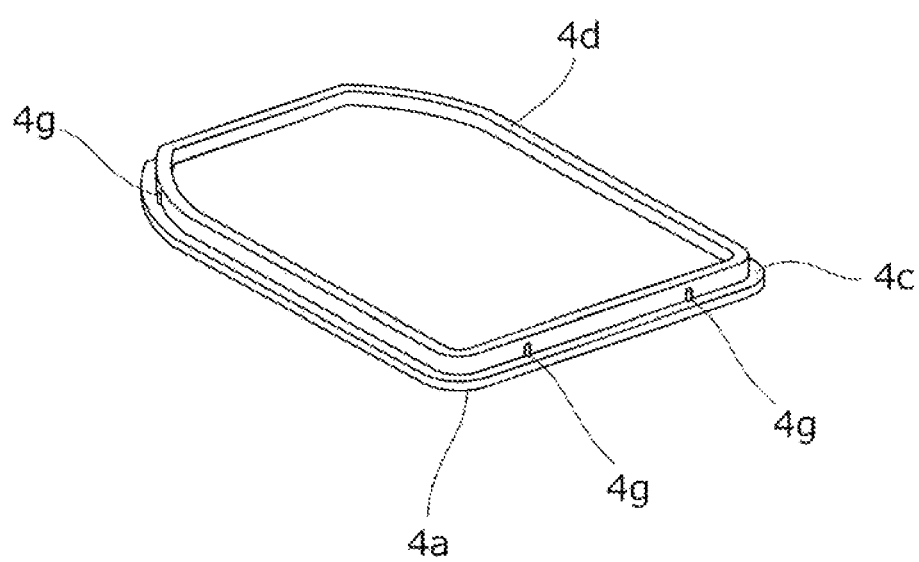
FIG. 3 is a perspective view of the cover member.

FIG. 2 is a bottom view of the cover member 4a, and FIG. 3 is a perspective view of the cover member 4a. The cover member 4a is formed by connecting a lid portion 4c, which is a flat plate having a trapezoidal shape and a rectangular shape joined together, and an insertion portion 4d having a tube-shaped cross-sectional shape similar to the lid portion 4c. It is preferable that the thickness of the lid portion 4c be 0.5 to 1.5 mm such that the laser light described later is easily transmitted.

The cover member 4a is a resin based on polyphenylene sulfide (PPS) or polybutylene terephthalate (PBT), and is preferably formed from, for example, a second material having a laser light transmittance of 20 to 40%. It should be noted that the cover member 4a may have the natural color of the material, but it is desirable to make the cover member 4a black by adding a pigment such as carbon black to the material.

In FIG. 2 and FIG. 3, on the outer periphery of the insertion portion 4d, a plurality of elongated ribs 4g constituted by a raised part of the outer peripheral surface are formed on an outer peripheral surface other than the pair of outer peripheral surfaces along the longitudinal direction.

In FIG. 1, a support portion 4f is formed on the lower surface of the lid portion 4c, and the control substrate 3 is supported by the support portion 4f. The control substrate 3 and the power supply portion 63 are connected by a flexible board FP1.

The tube-shaped member 4b includes an upper tube-shaped portion 4h having a cross-sectional shape similar to that of the insertion portion 4d, a lower tube-shaped portion 4i extending downward from the upper tube-shaped portion 4h, and a connector portion 4j extending horizontally from the lower end of the upper tube-shaped portion 4h. The terminals 4k disposed inside the connector portion 4j are connected to the control substrate 3 via a flexible board FP2. By connecting the connector portion 4j to a partner connector (not illustrated in the figure), power is supplied to the control substrate 3 from an external power source, and the stepping motor 60 can be driven.

The tube-shaped member 4b is a resin based on PPS or PBT, and has a laser light transmittance that is lower than that of the cover member 4a. For example, the tube-shaped member 4b is preferably formed from a first material having a transmittance of less than or equal to 3%.

When the cover member 4a is joined, the rigidity of the tube-shaped member 4b is increased by using a stepped portion or a curved surface so that the control substrate 3 can be positioned accurately.

Figure 4:
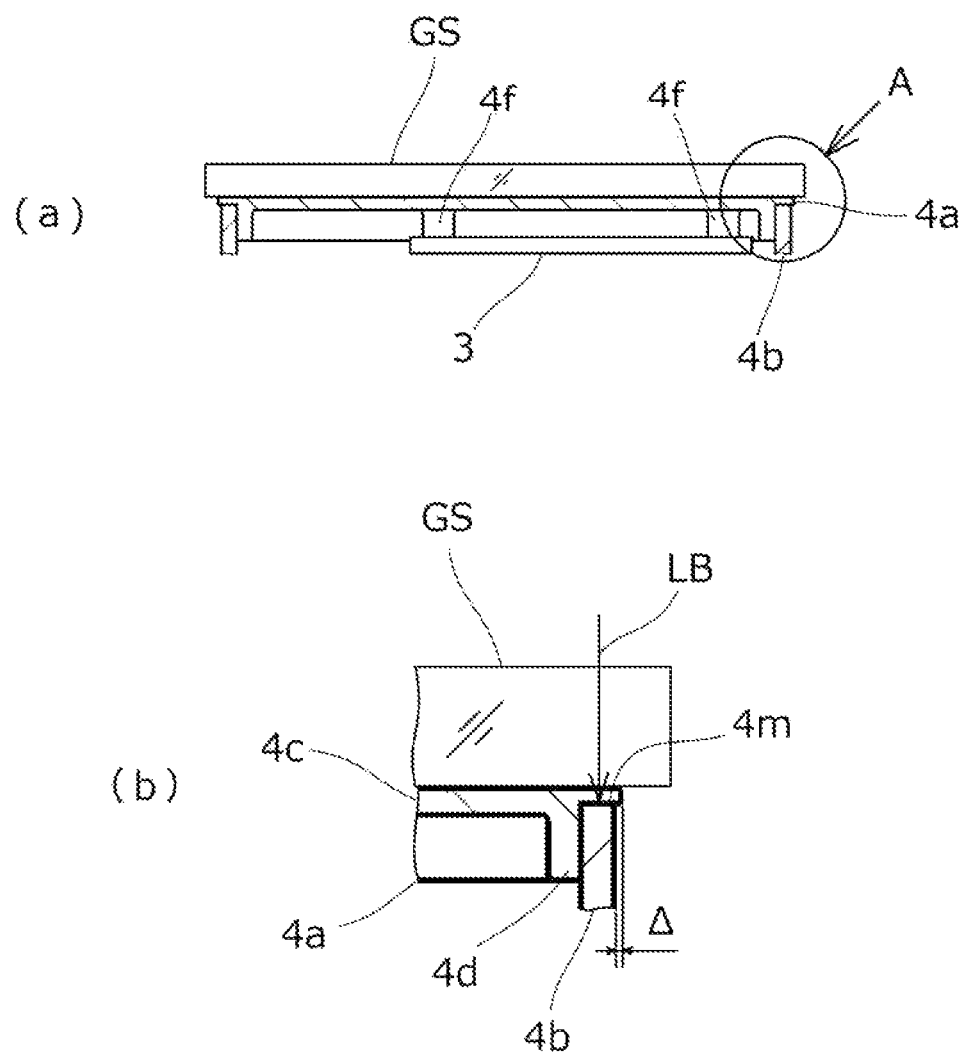
FIG. 4(a) is a cross-sectional view illustrating the cover member and a tube-shaped member.
FIG. 4(b) is an enlarged cross-sectional view illustrating the portion indicated by the arrow A in FIG. 4(a).

Next, the joining of the cover member 4a and the tube-shaped member 4b will be described. FIG. 4 is a diagram for explaining the joining process of the cover member 4a and the tube-shaped member 4b. As illustrated in FIG. 1, after accommodating the necessary parts in the tube-shaped member 4b, as illustrated in FIG. 4, the insertion portion 4d of the cover member 4a to which the control substrate 3 is attached is fitted inside the upper end 4m of the tube-shaped member 4b, and the lid portion 4c is brought into contact with the upper end 4m.

In this state, the glass flat plate GS is placed on the upper surface of the lid portion 4c and pressed toward the upper end 4m of the tube-shaped member 4b. In order to press the lid portion 4c such that no gaps are formed throughout the entire periphery between the lid portion 4c and the upper end 4m, it is desirable that the upper surface of the lid portion 4c is flat and the lid portion 4c is pressed using a flat plate. Meanwhile, in order to efficiently transmit the laser beam LB, it is desirable to use glass. Accordingly, in order to satisfy both of these requirements, the glass flat plate GS is used as a jig for pressing the lid portion 4c.

Subsequently, as illustrated in FIG. 4(b), a laser beam LB is emitted from above, passes through the glass flat plate GS and the lid portion 4c, and irradiates the surface of the upper end 4m. Here, the lid portion 4c, which is the heat receiving portion, is formed of a second material that substantially transmits the laser beam LB.

On the other hand, since the upper end 4m, which is the heat generation portion, is formed of the first material which absorbs the laser light LB, the irradiated portion generates heat, exceeds the glass transition point of the material and melts. In addition, the lid portion 4c, which is the heat receiving portion, is heated and melted by the heat generated at the portion irradiated with the laser beam at the upper end 4m. Subsequently, when the irradiation of the laser beam LB ceases, the two melted materials cool and solidify, and welding of the upper end 4m and the lid portion 4c is accomplished. The irradiation of the laser beam LB is performed along the entire periphery along the upper end 4m of the tube-shaped member 4b, and may be repeated a plurality of times.

At this time, as illustrated in FIG. 4(b), because the outer peripheral surface of the lid portion 4c protrudes outward from the outer peripheral surface of the upper end 4m with a distance Δ along a direction intersecting the irradiation direction of the laser beam LB, even if burrs are generated due to the melting of the heat generation portion and grow outward, the interference of the laser beam LB by the burrs is suppressed. As a result, deterioration of the appearance quality due to scorching of burrs or adhesion to the outer surface can be suppressed.

In addition, since the ribs 4g are formed on the insertion portion 4d of the cover member 4a, when the insertion portion 4d is fitted inside the tube-shaped member 4b, the ribs 4g come into contact with the inner wall of the tube-shaped member 4b in addition to the insertion portion 4d, thereby providing a positioning function in addition to making it possible to suppress rattling of the cover member 4a side with respect to the tube-shaped member 4b. As a result, the angle sensor 80 attached to the cover member 4a side and the permanent magnet 70 disposed on the tube-shaped member 4b side can be accurately positioned.

Further, since the contact between the ribs 4g and the inner wall of the tube-shaped member 4b suppresses the rattling of the cover member 4a with respect to the tube-shaped member 4b, coupled with the fact that the outer peripheral surface of the lid 4c protrudes outward from the outer peripheral surface of the upper end 4m at a distance Δ, the influence of burrs can be further suppressed.

It should be noted that, although the use of ultrasonic welding techniques for welding the cover member 4a and the tube-shaped member 4b can also be considered, there is a risk that the control substrate 3 or the like may be damaged due to the vibration caused by the application of ultrasonic waves. In contrast, according to the present embodiment, since welding is performed using a laser beam LB, there is no influence due to vibrations. Further, since the irradiation area can be kept small by performing irradiation using a laser beam LB with a narrow diameter, it is possible to avoid the influence of heat generated by the heat generation portion on the control substrate 3 or the like.

In particular, by performing irradiation using a laser beam LB with a narrow diameter, even in the case that the wall thickness of the upper end 4m is thin, it is possible to perform joining reliably, such that even if the tube-shaped member is small, high sealing performance can be obtained without using a separate component such as a packing or the like.

Second Embodiment

Hereinafter, the electric valve 1A according to the second embodiment will be described. The present embodiment has a different housing shape from the above-described embodiment, and does not have an angle sensor. The same materials as those in the above-described embodiment can be used as the first material and the second material. The same reference numerals are given to the same configurations as those in the above-described embodiment, and a redundant description thereof will be omitted.

Figure 5:
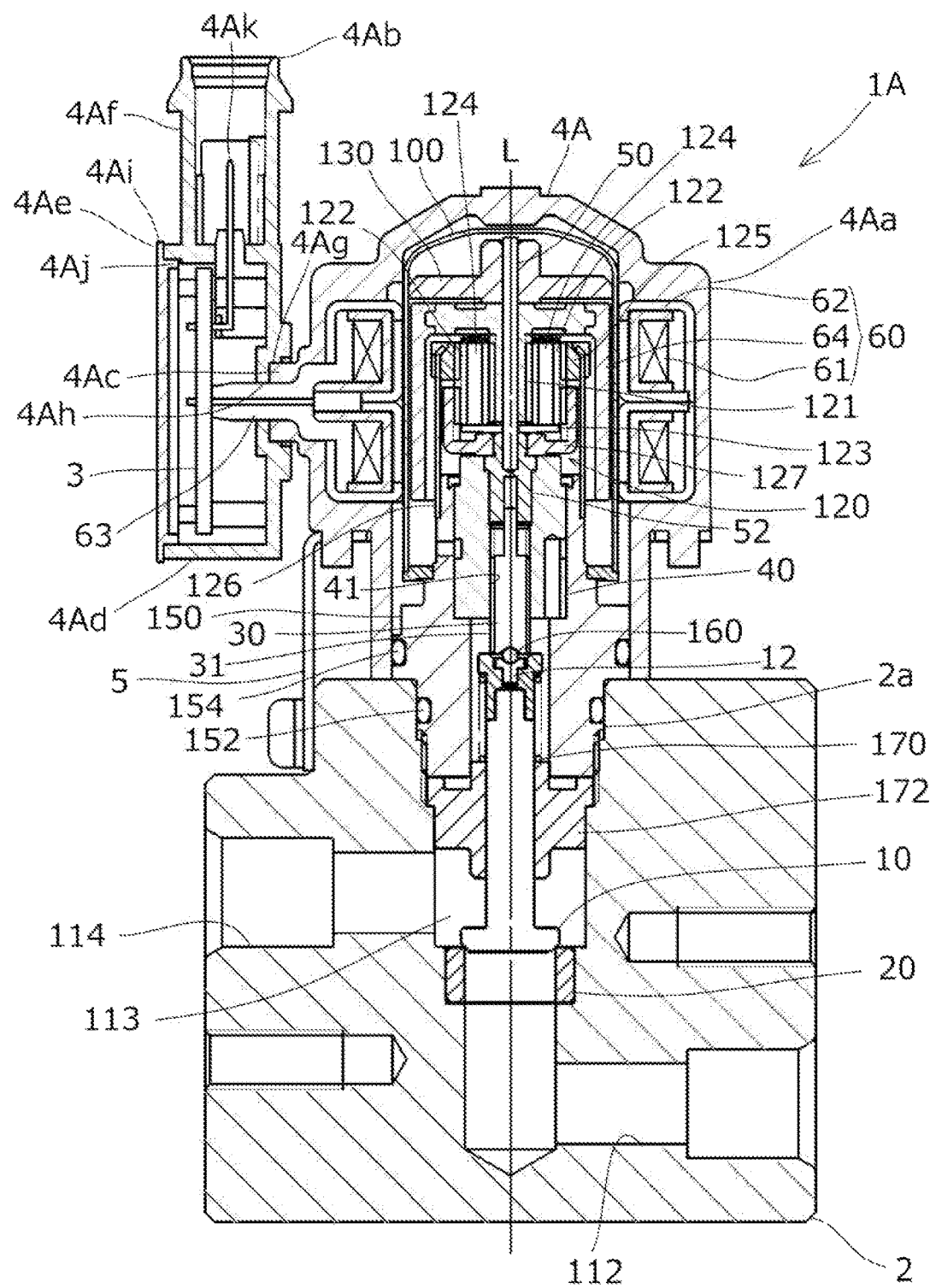
FIG. 5 is a schematic sectional view illustrating an overview of an electric valve according to a second embodiment.

FIG. 5 is a schematic cross-sectional view illustrating an overview of the electric valve 1A according to the second embodiment. The housing 4A includes a housing main body 4Aa for accommodating the drive system of the electric valve 1A, and a substrate holding portion 4Ab for holding the control substrate 3.

The hollow tube-shaped housing body 4Aa includes an annular portion 4Ac formed by a part of the outer periphery projecting thereof in an annular shape. The power supply portion 63 protrudes outward through the annular portion 4Ac.

The housing-shaped substrate holding portion 4Ab includes a bottomed tube-shaped member 4Ad, a cover member 4Ae that shields the end portion of the tube-shaped member 4Ad, and a connector portion 4Af which is joined to the tube-shaped member 4Ad.

A circular concave portion 4Ag that fits with the annular portion 4Ac is formed on the bottom wall of the tube-shaped member 4Ad. Further, the circular concave portion 4Ag and the inside of the tube-shaped member 4Ad communicate with each other by the communication hole 4Ah.

The cover member 4Ae is formed by connecting a lid portion 4Ai, which is a flat plate, and a tube-shaped insertion portion 4Aj in a continuous fashion.

The inner end of the terminal 4Ak disposed inside the connector portion 4Af is connected to the control substrate 3 disposed in the tube-shaped member 4Ad. The control substrate 3 is supported by and electrically coupled to the power supply portion 63 that penetrates the annular portion 4Ac from the inside of the housing body 4Aa and extends into the tube-shaped member 4Ad through the communication hole 4Ah.

Figure 6:
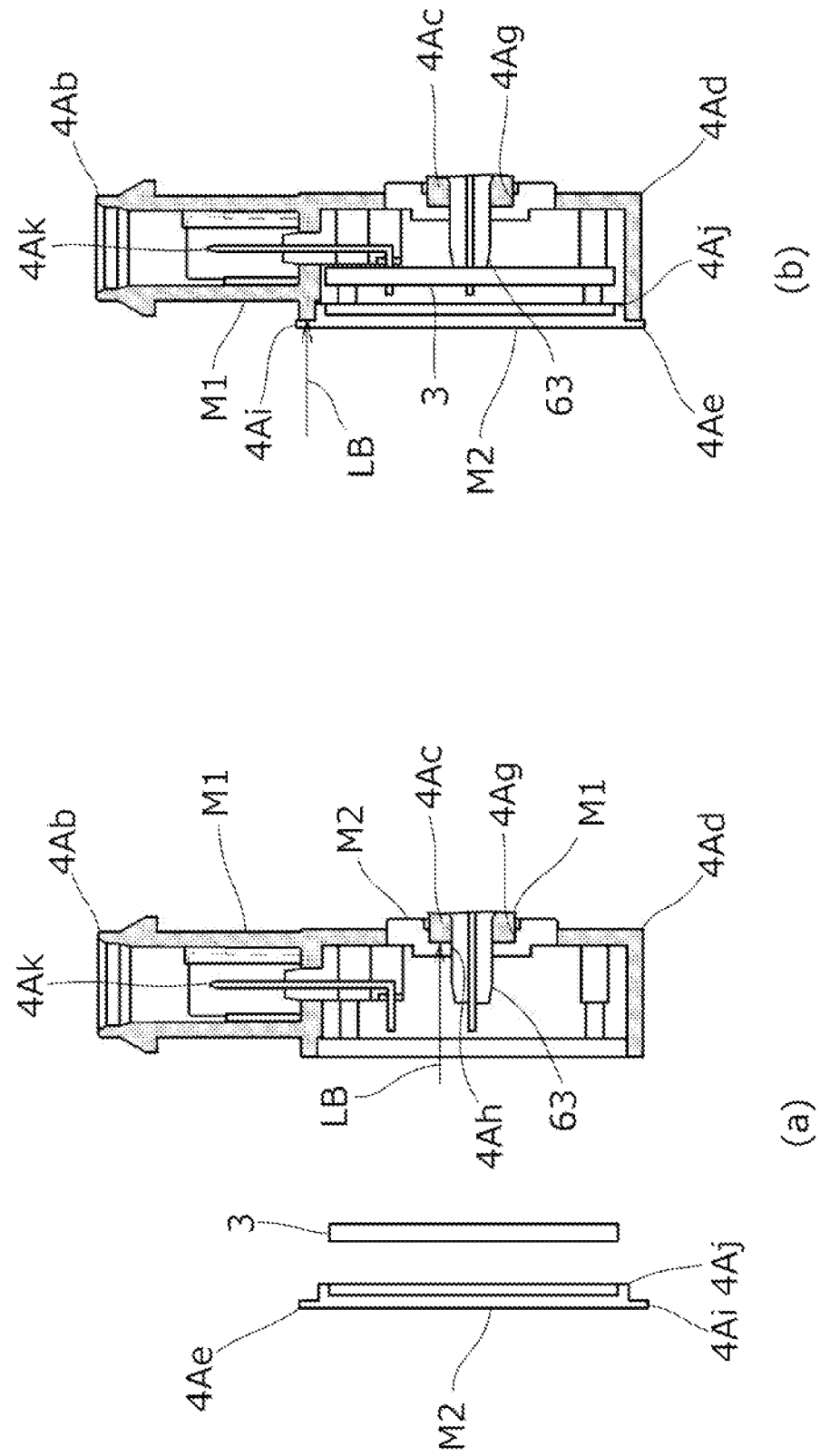
FIG. 6 is a sectional view illustrating an enlarged portion of the electric valve in the manufacturing process of the housing.

Next, the manufacturing process of the housing 4A will be described. FIG. 6 is a diagram for explaining the manufacturing process of the housing 4A.

Here, the tube-shaped member 4Ad of the substrate holding portion 4Ab is formed of a first material M1 having a low light transmittance and a second material M2 having a high light transmittance. More specifically, in FIG. 6, the periphery of the circular concave portion of the tube-shaped member 4Ad (indicated by the white-outlined cross-section) is formed from the second material M2, and the other portions of the tube-shaped member 4Ad (indicated by the dotted cross-section) are formed from the first material M1.

When the first material M1 and the second material M2 are each made of resin, such a tube-shaped member 4Ad can be molded by two-color molding in which materials are simultaneously injected and molded, or alternatively by insert molding or the like, in which one material is inserted into the other material and molded.

The adhesiveness of the resin material can be improved by forming the joint portion between the first material M1 and the second material M2 into a triangular shape or a convex shape. Further, in the case of insert molding, by reducing the volume of the resin material to be molded later with respect to the volume of the resin material to be molded first, the material temperature can be maintained, so that the degree of adhesion can be further improved.

On the other hand, the housing body 4Aa (at least the annular portion 4Ac) is formed of the first material M1, and the cover member 4Ae is formed of the second material M2.

During the manufacturing process of the housing 4A, as illustrated in FIG. 6(a), the circular concave portion 4Ag of the tube-shaped member 4Ad from which the cover member 4Ae and the control substrate 3 have been removed is fitted into the annular portion 4Ac of the housing body 4Aa.

While maintaining such a state, the laser beam LB is emitted from the tube-shaped member 4Ad side, transmitted through the second material M2, and irradiated on the annular portion 4Ac. As a result, the annular portion 4Ac can be welded to the tube-shaped member 4Ad.

After the welding of the entire periphery of the annular portion 4Ac is completed, as illustrated in FIG. 6(b), the control substrate 3 is connected to the power supply portion 63 and the terminal 4Ak by soldering or the like and held in the tube-shaped member 4Ad. Further, after covering the end portion of the tube-shaped member 4Ad with the cover member 4Ae, the laser beam LB is emitted, transmitted through the lid portion 4Ai of the cover member 4Ae, and irradiates the end portion of the tube-shaped member 4Ad. By irradiating the cover member 4Ae with the laser beam LB over the entire periphery, the tube-shaped member 4Ad can be welded to the lid portion 4Ai.

It should be noted that the present invention is not limited to the above-described embodiments. Within the scope of the present invention, it is possible to freely combine the above-described embodiments, modify any component of each embodiment, or omit any component in each embodiment.

REFERENCE SIGNS LIST 1, 1A: Electric valve
2: Lower base member
3: Control substrate
4, 4A: Housing
10: Valve body
20: Valve seat
30: Driver
31: Male screw
40: Guide member
41: Female screw
50: Rotary shaft
52: Connecting member
60: Stepping motor
62: Stator member
64: Rotor member
70: Permanent magnet
80: Angle sensor
100: Can
112: First flow path
113: Valve chamber
114: Second flow path
120: Power transmission mechanism
121: Solar gear body
122: Planetary gear
123: Carrier
124: Shaft
125: Ring gear
126: Support member
127: Second ring gear
129: Output gear
130: Partition member
150: Holder
152: Packing
154: Packing
160: Ball
170: Spring member
172: Spring receiving member

The invention claimed is:
1. An electric valve comprising:
a motor including a rotor member, a stator member for applying a rotational force to the rotor member, and a can in which the rotor member is disposed;

a power transmission mechanism for converting rotational movement of the rotor member into axial movement of a valve body;

a housing for accommodating the motor and the power transmission mechanism; and a base member connected to the housing and provided with a valve seat to which the valve body is separated or seated, wherein:

the housing includes:
- a heat generation portion formed of a first material,
- a heat receiving portion formed of a second material and bonded to the heat generation portion, and
- a tube-shaped member and a cover member for shielding the tube-shaped member, a laser light transmittance in the first material is lower than a laser light transmittance in the second material, the heat generation portion is a part of the tube-shaped member, the heat receiving portion is part of the cover member, the cover member holds a substrate provided with a drive circuit for driving the motor, and the tube-shaped member is provided with a connector portion that can be connected to an external power source, the cover member includes an insertion portion that fits inside an end portion of the tube-shaped member, and ribs formed on an outer peripheral surface of the insertion portion, the motor is disposed on the tube-shaped member, and an angle sensor for detecting a rotation angle of the rotor member is disposed on the cover member, and the can of the motor is disposed between the angle sensor and the rotor member.

2. The electric valve according to claim 1, wherein:

the heat generation portion is welded to the heat receiving portion by irradiating the heat generation portion with a laser beam that has passed through the heat receiving portion.

3. The electric valve according to claim 1, wherein:

the cover member includes a lid portion for covering an end portion of the tube-shaped member;

the heat generation portion is an end portion of the tube-shaped member; and the heat receiving portion is the lid portion.

4. The electric valve according to claim 3, wherein:

the lid portion protrudes outward from an end portion of the tube-shaped member along a direction that intersects an irradiation direction of the laser beam.

5. The electric valve according to claim 3, wherein:

a surface of the lid portion that is opposite to an end portion of the tube-shaped member is flat.

6. The electric valve according to claim 1, wherein:

the housing further includes a housing body, the tube-shaped member being connected to the housing body; and the housing body is formed of the first material and the tube-shaped member is formed of the first material and the second material.

7. The electric valve according to claim 1, wherein:

the ribs formed on the outer peripheral surface of the insertion portion are configured to contact an inner wall of the tube-shaped member to provide accurate positioning of the angle sensor relative to the rotor member.

* * * * *